Patented Apr. 20, 1937

2,078,086

UNITED STATES PATENT OFFICE 2,078,086

REFRACTORY AND PROCESS OF MAKING

Harley C. Lee, Columbus, Ohio, assignor to Basic Dolomite, Inc., Cleveland, Ohio, a corporation of Ohio No Drawing. Application October 31, 1933, Serial No. 696,120

4 Claims. (Cl. 106—9)

It has been known heretofore to prepare refractory material by admixing a rather large amount of flue dust with crushed dolomite and lightly firing at 2200–2500° F. to form a coating of flux on the outside of calcined dolomite grains. Excessive amounts of iron are thus required, it being difficult to attain uniform distribution, and the grains require a subsequent firing to attain ultimate shrinkage. In accordance with the present invention however, it now becomes possible to incorporate a flux component with dolomite or the like uniformly and without the disadvantageous incorporation of an excess of flux. A completely shrunk product may be attained at the same time. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

For the preparation of refractory material for such usages as in open hearth furnaces, etc., the dolomite is crushed to desired size, for example minus ¾ inch. A flux suspension or paint is prepared by grinding the flux and a suitable liquid vehicle binder. The flux component may be for instance mill scale or other desired form of iron and this may be made up in suspension with a colloid, as a silicious colloid, for instance water glass solution or preferably clay and water, such as ball clay or highly plastic clay. A small proportion of bentonite may be advantageously employed with other clay, in some cases. Thus, for each 100 parts of the dolomite, mill scale in the proportion of 1.5 to 5.0 parts by weight, and clay in 0.3 to 2 parts, may be ground in 1 to 3 parts of water, and when the suspension is reduced to the desired fineness, which may be for instance on the order of 100 mesh or finer, the crushed dolomite is coated with the suspension by mixing together so that the suspension thoroughly coats or films every grain of the dolomite. On drying, the material may be applied in position, for instance in open hearth furnace lining, or other usage as desired. In such manner, raw dolomite may be had in a form carrying flux adherent to permit handling and applying in place of usage.

For the preparation of a low flux dolomite clinker, dolomite is disintegrated or crushed to the size desired, for example such as to pass a ⅜ inch opening and be retained on a 20 mesh screen. A uniform flux suspension is made up in a suitable liquid or paint-like condition with a binder vehicle. As flux component, ordinarily iron in suitable form, as for instance conveniently mill scale or other desired form of iron oxide, is employed. The flux and binder may be separately ground and then thoroughly mixed or the flux is ground with the binder. A thinly fluent paint or coating material is thereby produced, which by incorporation with the crushed dolomite, coats or films the surfaces of each particle, as suitable mixing is performed. The binder is advantageously a colloid, such as an inorganic colloid. While in some cases I may employ water glass solution as vehicle, ordinarily I prefer a clay suspension. A plastic clay or ball clay is desirable. Water glass or other similar-acting substance may be added to the clay suspension to increase its effectiveness. A small amount of bentonite may advantageously be mixed with other clay. As an example, for each 100 parts of dolomite, mill scale in the proportion of about 1.5 to 5 parts by weight and clay about 0.3 to 2.0 parts, are mixed with about 1 to 3 parts of water, and the mixture is ground, desirably to 100 mesh or finer, a fluent or paint-like composition resulting. The crushed dolomite of desired size is then mixed with the coating composition prepared. By stirring and admixture, the mill scale and clay supension then thoroughly coats every piece of dolomite, forming a consistent film over the surfaces. By burning the coated particles in a suitable kiln, usually a rotary kiln, to a suitable temperature as for instance 2750° F. or more, the flux component impregnates the grains of dolomite uniformly, and a dead burned shrunk clinkered dolomite refractory is prepared. The amount of iron carried in such manner is particularly low as compared with prior usages, and highly desirable refractories may be thus prepared with an iron content of 3 to 5½ per cent. Just sufficient flux is present to afford an adequate bonding for the dolomite as applied ultimately in place in a furnace lining or other usage, and surplus flux with its attendant lowering of the refractory standard is avoided. Magnesium oxide being inherently of highly refractory and infusible character, any addition of flux, as necessitated in bonding such material together, constitutes a factor desirable minimized insofar as possible. By the present procedure therefore, with its controlled application of flux, surplus is particularly obviated, and a consequent highly practical gain in refractory result is obtained.

Other modes of applying the principle of the invention may be employed, change being made as regards the details described, provided the features stated in any of the following claims, or the equivalent of such, be employed.

I therefore particularly point out and distinctly claim as my invention:—

1. As a new article of manufacture, a refractory material consisting of crushed dolomite particles of substantial size coated with an adherent film of a clay binder and iron oxide.

2. As a new article of manufacture, a refractory material consisting of crushed dolomite particles of substantial size coated with an adherent film of a colloidal silicious binder and iron oxide.

3. As a new article of manufacture, a refractory material consisting of raw crushed dolomite particles of substantial size coated with an adherent film of a binder of clay and iron oxide.

4. As a new article of manufacture, a refractory material consisting of crushed dolomite particles of substantial size coated with an adherent film of colloidal clay and iron oxide, the iron oxide being in amount about 1.5-5.5 per cent and the clay 0.3 to 2 per cent with reference to the dolomite.

HARLEY C. LEE.